United States Patent [19]

Cole

[11] 4,170,265

[45] Oct. 9, 1979

[54] CULTIVATOR

[76] Inventor: Russell P. Cole, P.O. Box 71, Thibodaux, La. 70301

[21] Appl. No.: 766,149

[22] Filed: Feb. 7, 1977

[30] Foreign Application Priority Data

Oct. 14, 1976 [MX] Mexico .................................. 166659

[51] Int. Cl.² ........................ A01B 39/22; A01B 39/02
[52] U.S. Cl. .................................. 172/156; 172/600;
172/624; 280/490 A; 280/461 A
[58] Field of Search ............... 172/629, 646, 645, 649,
172/657, 617, 484, 307, 417, 156, 623, 624, 619,
40, 658; 280/460 R, 460 A, 490 A

[56] References Cited

U.S. PATENT DOCUMENTS

| 1,180,845 | 4/1916 | Gustafson | 172/651 X |
|---|---|---|---|
| 1,209,899 | 12/1916 | Springer | 172/657 |
| 1,613,079 | 1/1927 | Brink | 172/658 |
| 2,751,834 | 6/1956 | Hines | 172/307 X |
| 2,826,131 | 3/1958 | Willet | 172/657 |
| 2,882,982 | 4/1959 | Hobbs | 172/484 |
| 2,947,372 | 8/1960 | Olson | 172/624 |
| 3,203,487 | 8/1965 | Whitesides | 172/548 |
| 3,220,488 | 11/1965 | Becker | 172/307 X |
| 3,327,786 | 6/1967 | Meyer | 172/484 X |
| 3,561,539 | 2/1971 | Evans | 172/40 |
| 3,601,202 | 8/1971 | Steffe | 172/484 |
| 3,737,156 | 6/1973 | Ward | 172/708 |
| 3,921,726 | 11/1975 | Connor | 172/624 |
| 3,982,593 | 9/1976 | Grobey | 172/40 |
| 4,019,754 | 4/1977 | Hinckley | 280/456 R |

Primary Examiner—Richard J. Johnson
Attorney, Agent, or Firm—Browning, Bushman & Zamecki

[57] ABSTRACT

Cultivator apparatus comprises an elongate main frame and a plurality of cultivator sub-assemblies spaced along the length of the main frame and each including a sub-assembly frame. Respective linking means connect each of the sub-assembly frames to the main frame for independent floating movement of the sub-assembly frame with respect to the main frame while preventing tilting of the sub-assembly frame with respect to the main frame.

5 Claims, 6 Drawing Figures

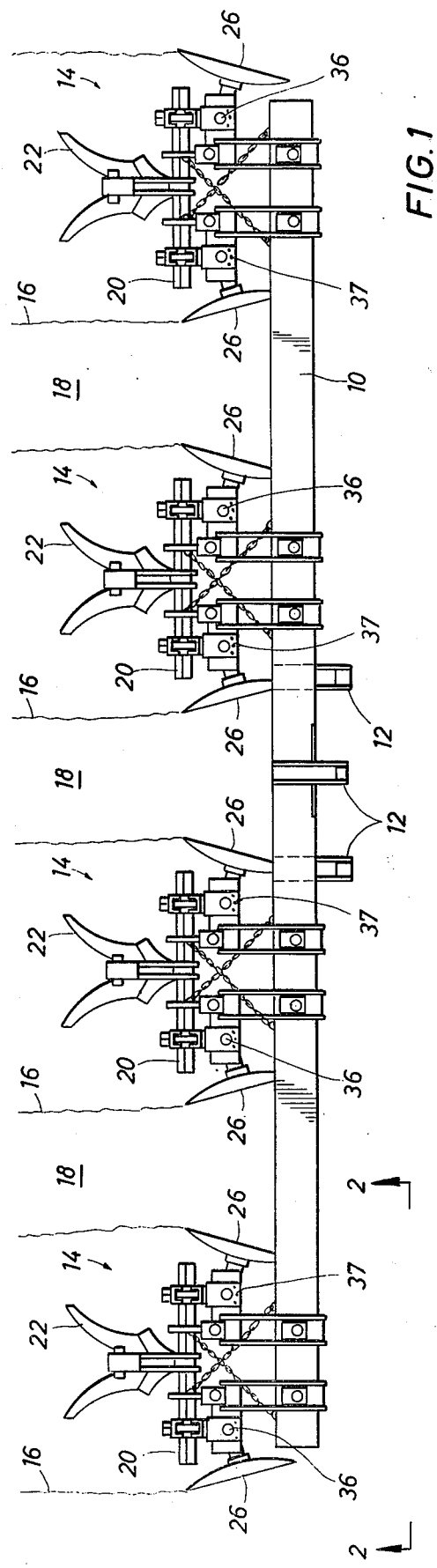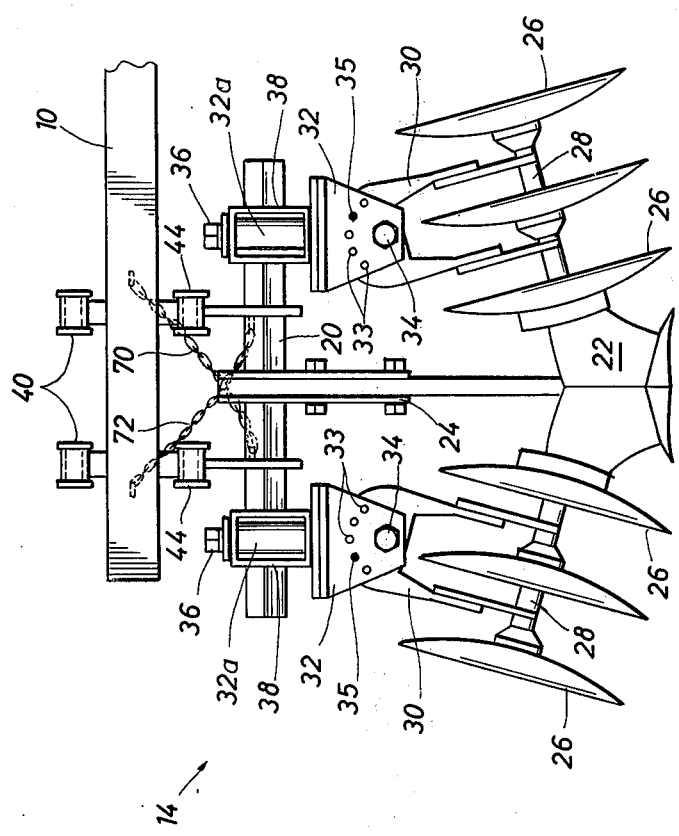

CULTIVATOR

BACKGROUND OF THE INVENTION

1. Field of the Invention

The present invention relates to agricultural cultivators used to work the soil in fields. Typically, such cultivators include a tool bar mounted on a tractor or other vehicle to extend transversely thereto and a number of sub-assemblies mounted on the tool bar along its length. Each of the sub-assemblies includes cultivating implements and is intended to work a respective furrow in the field.

Although generally parallel, the rows in the field deviate from true parallelism in both vertical and transverse horizontal directions. Thus, while cultivators of this type allow simultaneous cultivation of a number of rows upon a single pass of the tractor across the field, they are somewhat inefficient in that the portions of the rows which deviate from parallelism are improperly or incompletely cultivated.

Accordingly, there has been a need for a cultivator which allows complete and proper cultivation of a number of rows simultaneously and which is still relatively uncomplicated and practical to manufacture.

2. Description of the Prior Art

U.S. Pat. No. 3,080,930 to Morkoski et al discloses a cultivator including two tool bars extending outwardly at opposite sides of a central support. Each of the tool bars can tilt with respect to the support about a single pivot axis extending longitudinally with respect to the vehicle to accommodate the gross vertical contours of the ground. However, there is no provision for accomodation of fine deviations, either vertical or horizontal, between the adjacent rows being cultivated by the various sub-assemblies on a tool bar.

The Morkoski et al device also includes means for raising the entire group of sub-assemblies on the tool bar to an inoperative position. The entire tool bar can be swung forward so that it extends longitudinally with respect to the tractor for transport, and the innermost sub-assembly can be raised higher than the others to clear the tractor wheel during such motion.

U.S. Pat. No. 2,882,982 to Hobbs shows a plurality of implements arranged in pairs on a large frame. The implements are rake-like devices intended to ride on the ridges of the rows in the fields to clear away excess soil from the lower portions of plants such as peanut plants. The implements of each pair are pivotally mounted so that they can diverge to allow passage of a rock or other obstruction therebetween.

However, the pivoting is of the single axis type which causes tilting of the implements with respect to the frame. While this might be acceptable in implements of the type described, it is not suitable for implements which work the ground. Furthermore, since the implements ride on the ridges rather than in the furrows, springs are required to return the implements to their normal positions after they have diverged.

The implements can also pivot vertically. However, during forward motion of the tractor, this pivotal movement is also of the single axis type.

U.S. Pat. No. 2,751,834 to Hines et al discloses a weeder in which an entire set of implements can float vertically as a unit. No independent floating of individual implements is permitted, nor is horizontal movement permitted.

SUMMARY OF THE INVENTION

The cultivator of the present invention comprises an elongate tool bar or main frame and a plurality of sub-assemblies spaced along its length. Each of the sub-assemblies comprises a sub-assembly frame. A respective first linking means connects each of the sub-assembly frames to the main frame in a manner which permits independent non-tilting floating movement of the sub-assembly frame with respect to the main frame in a first direction, e.g. the transverse horizontal direction with horizontal tilting of the sub-assembly frame with respect to the main frame being prevented.

The cultivator preferably also comprises respective second linking means connecting each of the sub-assembly frames to the main frame for independent non-tilting floating movement of the sub-assembly frame with respect to the main frame in a second direction transverse to the first, e.g. vertical, with relative vertical tilting being prevented.

Thus, the individual sub-assemblies can follow fine deviations from parallelism in their respective furrows without changing the preferred angle of the cultivating implements.

The first and second linking means of each sub-assembly may have some parts in common and, in the preferred embodiments, are constructed in a manner which is particularly practical, from manufacturing and maintenance viewpoints, while still dependable. This makes the cultivator relatively inexpensive and long-lived. In particular, the linking means of each sub-assembly includes four paralled link arms and unique joint means universally connecting one end of each arm to the main frame and the other end of the arm to the sub-assembly frame.

It is a principal object of the present invention to provide a cultivator which allows independent floating movement of a plurality of sub-assemblies with respect to a main frame while preventing relative tilting.

Another object of the present invention is to provide for both horizontal and vertical floating motion of the sub-assemblies.

Still another object of the present invention is to provide unique linking means for the floating motion.

Still other objects, features, and advantages of the present invention will be made apparent by the following detailed description of the preferred embodiment, the drawing and the claims.

BRIEF DESCRIPTION OF THE DRAWINGS

FIG. 1 is a top plan view of the cultivator of the present invention.

FIG. 2 is an enlarged front elevational view of one of the sub-assemblies of the cultivator of FIG. 1.

DESCRIPTION OF THE PREFERRED EMBODIMENT

Figure 3:
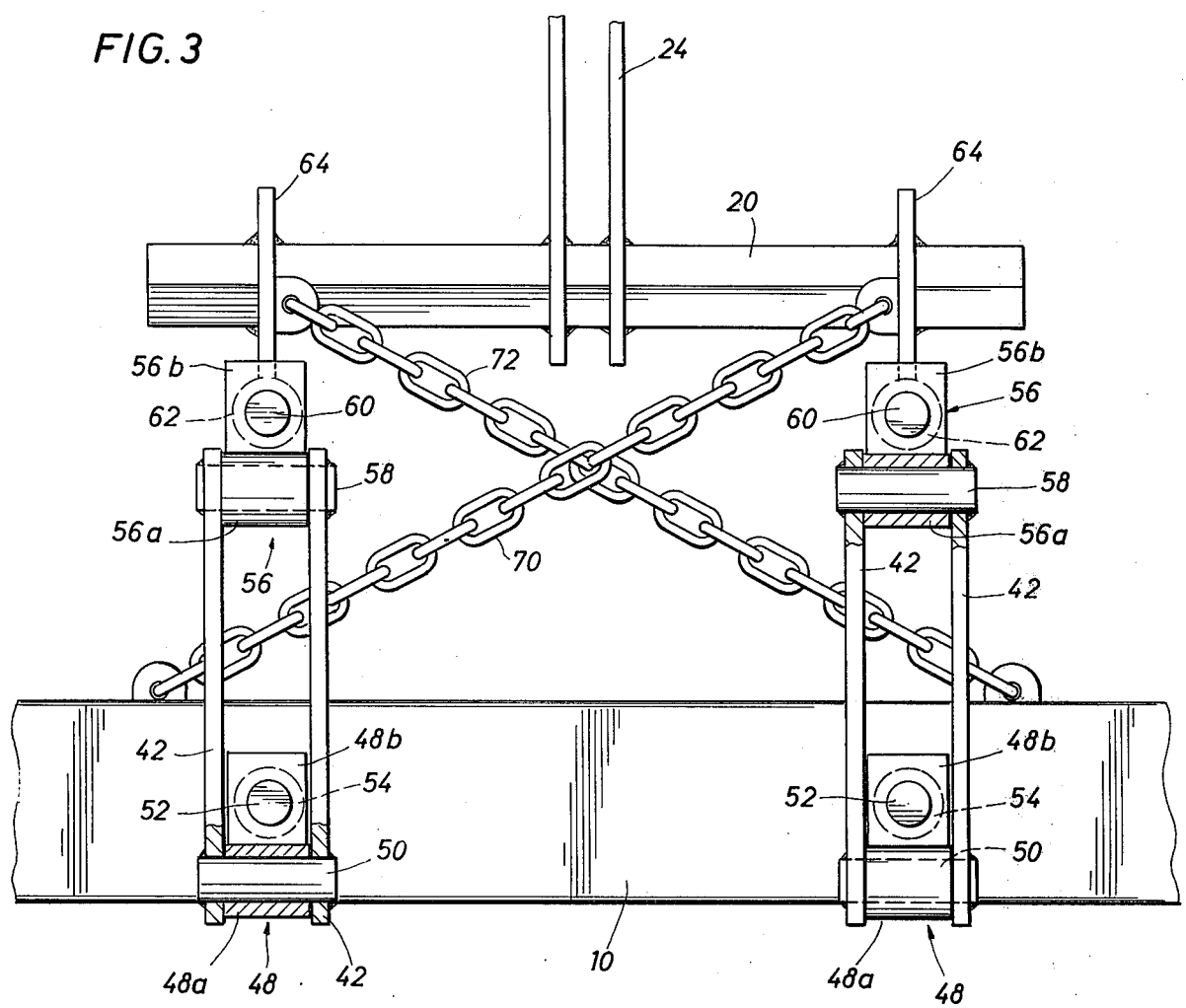
FIG. 3 is a further enlarged top plan view of the linking means of one sub-assembly in a centerred position, the proportions having been changed somewhat for purposes of illustration.
Figure 4:
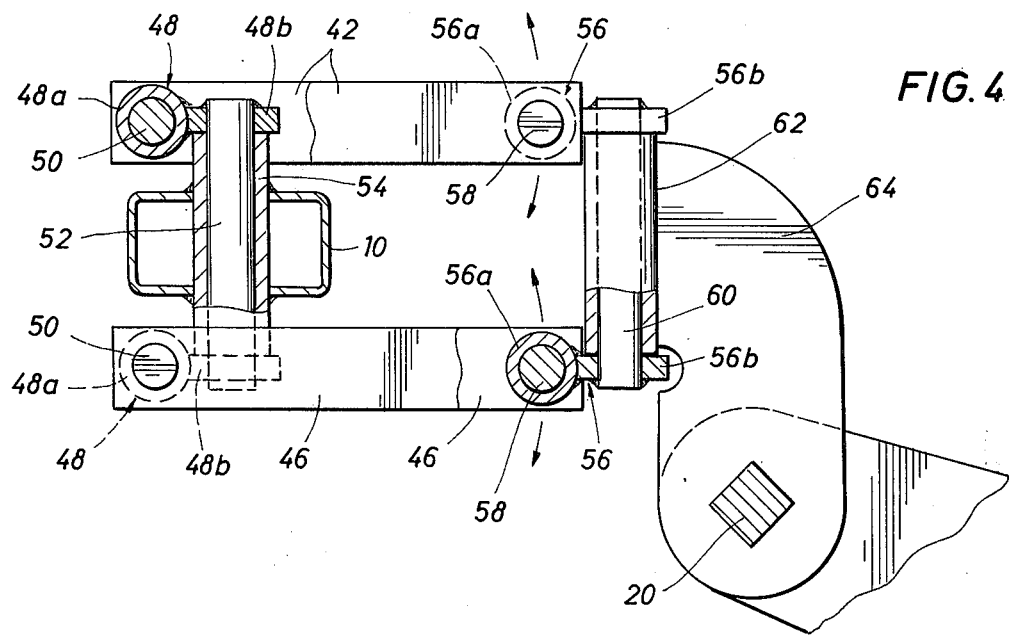
FIG. 4 is a side elevational view of the apparatus of FIG. 3 in a centered position with parts broken away and parts shown in section.

Referring to the drawings, there is shown a cultivator comprising a main tool bar or main frame 10 which is adapted to be mounted on a tractor by hitch means 12 so that it will extend transversely across the tractor. Thus as the tractor moves along the rows in a field, the bar 10 will extend transversely across the rows as shown. Four cultivator sub-assemblies 14 are mounted along the length of the tool bar 10, and each forms and/or rides generally within a respective one of four adjacent furrows 16 between the ridges or rows 18.

Each of the sub-assemblies 14 comprises a sub-assembly tool bar 20 lying parallel to the main tool bar 10. Each of the tool bars 20 carries a number of implements for working the soil. These include a central fixed plow or "middle buster" 22 which is adjustably carried by a bracket 24 mounted on the tool bar 20. Two gangs of rotatable discs 26, each gang having a common shaft 28, are mounted on respective yokes 30 which are in turn mounted on yokes 32 having shanks 32a received by supports 38 removably rigidly affixed to tool bar 20. By loosening respective bolts 34 and 35 and replacing bolt 35 in the appropriate one of a series of holes 33, each bracket 30 may be adjusted in a vertical plane with respect to the respective bracket 32 and then clamped in the desired position by retightening the bolts 34 and 35. Similarly, by loosening respective bolts 36 and 37, each of the brackets 32 may be adjusted in a horizontal plane by rotating the shank 32a in the support 38. Thus the discs 26 can be angularly adjusted with respect to the tool bar 20 to provide for proper working of the soil.

Each of the sub-assemblies 14 is mounted on the tool bar 10 by linking means which allow vertical and transverse horizontal floating motion of the sub-assembly with respect to the tool bar 10 independently of the other sub-assemblies while preventing tilting of the sub-assembly tool bar 20 with respect to the main tool 10, i.e. maintaining a parallel relationship between the tool bars. Terms such as transverse, lateral, longitudinal, etc. will be used herein with reference to the furrows and ridges 16 and 18 unless otherwise noted.

The linking means for each of the sub-assemblies 14 comprises a first pair of longitudinally extending, laterally spaced apart link arms 40 disposed above the main tool bar 10 and extending toward the sub-assembly tool bar 20. Each of the arms 40 comprises a pair of parallel, laterally spaced apart plates 42. A second pair of similar link arms 44, each comprised of parallel plates 46 is disposed below the tool bar 10. Each of the arms 40 is vertically aligned with a respective one of the arms 44.

First joint means connect the rear ends of each of the arms 40, 44 to the main tool bar 10 for relative universal movement, while second joint means connect the front ends of each of the arms to the sub-assembly tool bar 20 for relative universal movement. The first joint means include four brackets 48 each disposed between the plates of a respective one of the link arms at the rear end. Each of the brackets 48 includes a generally transverse horizontal cylinder 48a and a flange 48b extending forwardly therefrom and having an opening extending generally vertically therethrough. A pivot member in the form of a pin 50 extends through each of the cylinders 48a and is welded or otherwise rigidly affixed to each of the adjacent plates 42 or 46.

The two flanges 48b of the brackets 48 associated with each two vertically aligned arms 40 and 44 receive a connecting member in the form of pin 52 through their openings and are welded to the pin 52. A sleeve 54 is rotatably mounted on each pin 52 and extends between the two attached flanges 48b. Sleeve 54 extends through and is welded to the main tool bar 10 to mount the first joint means and the attached link arms on the tool bar 10 and also to serve as a pivot member permitting horizontal pivotal movement of the brackets 48 and connected arms 40 and 44 with respect to the tool bar 10. Pins 50 in turn permit vertical pivotal movement of the arms 40 and 44 with respect to the brackets 48 and connected tool bar 10.

The second joint means include four brackets 56, similar to bracket 48, each disposed partially between the plates 42 or 46 of a respective one of the arms 40 or 44 at its front end. Each of the brackets 56 includes a generally transverse horizontal cylinder 56a disposed between the respective plates 42 or 46 and a flange 56b extending forwardly from the cylinder 56a and the respective arm 40 or 44. A pivot member in the form of a pin 58 extends through each cylinder 56a and is welded to the two adjacent plates 42 or 46.

The two flanges 56b associated with each two vertically aligned arms 40 and 44 receive a connecting member in the form of a pin 60 through their openings and are welded to the pin 52. A sleeve 62 is rotatably mounted on each pin 60 and extends between the two attached flanges 56b. A respective bracket 64 is rigidly carried by each of the sleeves 62 and extends forwardly and downwardly therefrom. The sub-assembly tool bar 20 is fixedly mounted in the lower ends of the brackets 64. Sleeves 62 serve as pivot members permitting horizontal pivotal movement of the brackets 56 and connected arms 40 and 44 with respect to the brackets 64 and the tool bar 20. Pins 58 in turn permit vertical pivotal movement of the arms 40 and 44 with respect to the brackets 56 and connected brackets 64 and tool bar 20.

Figure 5:
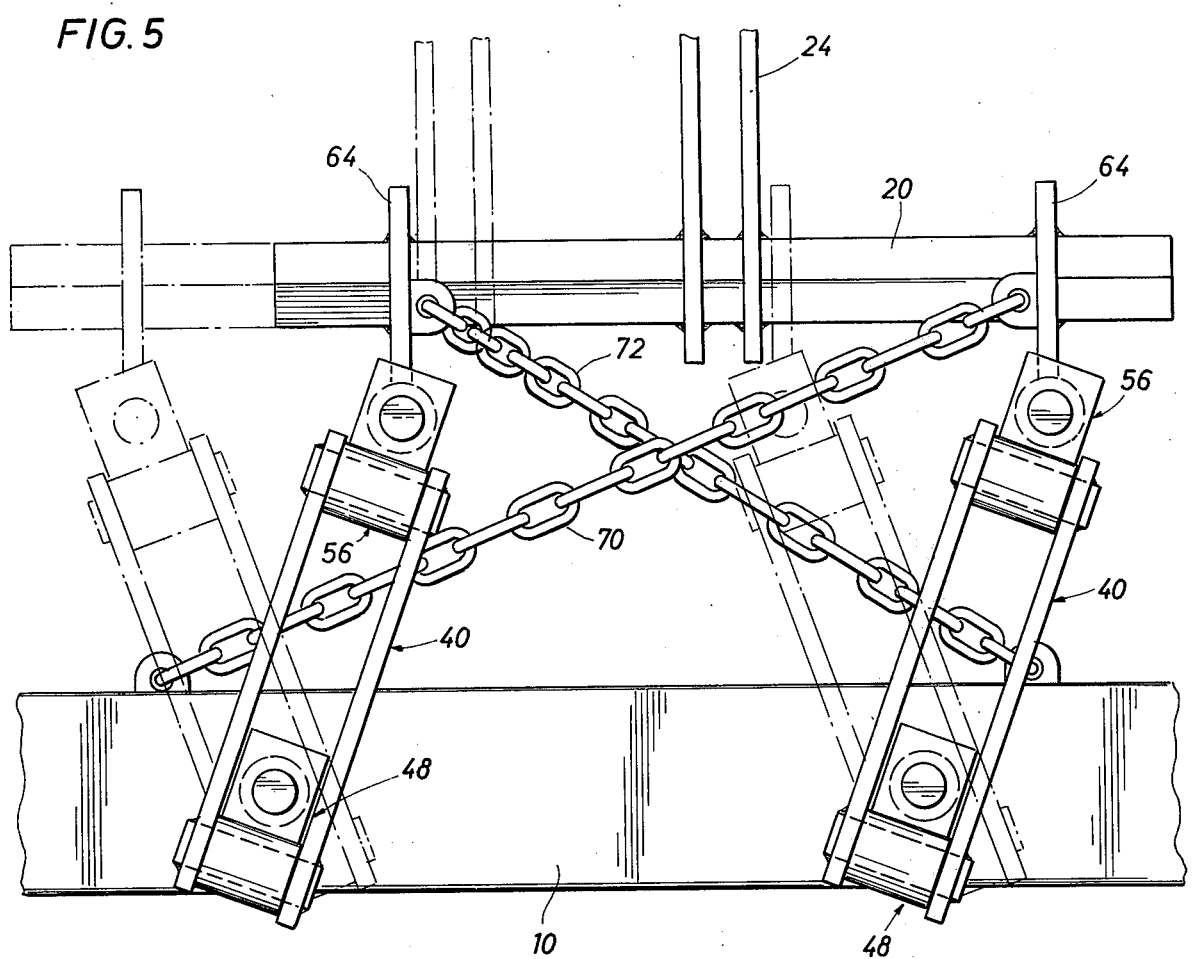
FIG. 5 is a view similar to that of FIG. 3 showing different horizontal positions of the linking means.
Figure 6:
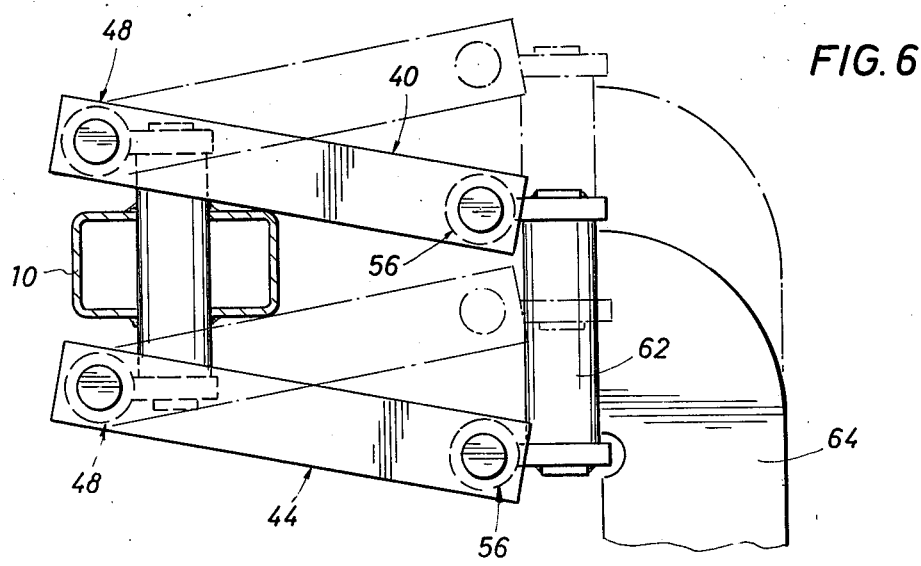
FIG. 6 is a view similar to that of FIG. 4 showing different vertical positions of the linking means.

Referring now to FIGS. 5 and 6, the movements permitted by the linking means are illustrated. The horizontal floating movement is shown in FIG. 5. There it can be seen that the upper link arms 40, together with the tool bars 10 and 20 and the interconnecting joint means form a parallelogram type linkage which allows the tool bar 20 to swing horizontally with respect to the tool bar 10 while keeping the two bars parallel. Two chains 70 and 72, each connecting a respective one of the brackets 64 to the main tool bar 10, limit the horizontal movement. When the tool bar 20 swings to the right to the position shown in solid lines, the chain 70 is drawn taut preventing further movement to the right. When the tool bar 20 swings to the left, the chain 72 will limit such movement to the position shown in phantom.

The lower link arms 44 with the associated joint means form a similar parallelogram linkage for horizontal movement thereby augmenting the linkage formed by the upper arms 40 and strengthening and stabilizing the structure.

Each of the upper link arms 40 forms, with the aligned lower link arm 44 and associated joint means, a parallelogram linkage for vertical floating movement. One such linkage is shown in FIG. 6. It can be seen that as the bracket 64 with the attached tool bar 20 moves downwardly, the upper link arm 40 will abut the main tool bar 10 thereby limiting the downward movement to the position shown in solid lines. Similarly, as the bracket 64 moves upwardly, the lower link arm 44 will abut the tool bar 10 limiting upward movement to the position shown in phantom.

Each of the parallelogram linkages for vertical floating has components in common with each of the linkages for horizontal floating and vice versa. Thus the linking arrangement provides the stability of double linkages for each direction of motion, while minimizing the number of parts required and simplifying the apparatus.

Numerous modifications of the preferred embodiment shown may be made without departing from the spirit of the invention. Such modifications might include differences in the joint means, other means for limiting the floating movement, etc. In some embodiments other types of parallelogram linkage arrangements might be provided in which the vertical and horizontal linkages did not have parts in common or in which only a single parallelogram linkage was provided for each direction of movement. In still other embodiments, linkages other than the parallelogram type might be used. It is thus intended that the scope of the invention be limited only by the claims which follow.

I claim:

1. Cultivator apparatus comprising:
   an elongate main frame;
   a plurality of cultivator sub-assemblies spaced along the length of said main frame, each of said sub-assemblies comprising a sub-assembly frame;
   a respective first linking means connecting each of said sub-assembly frames to said main frame for independent non-tilting floating movement of said sub-assembly frame with respect to said main frame in a first direction;
   and a respective second linking means connecting each of said sub-assembly frames to said main frame for independent non-tilting floating movement of said sub-assembly frame with respect to said main frame in a second direction transverse to said first direction;
   and wherein the first and second linking means for each of said sub-assemblies comprise a first pair of generally parallel link arms spaced from each other in said first direction and a second pair of link arms spaced from each other in said first direction and spaced from said first pair in said second direction, first joint means connecting one end of each of said link arms to said main frame for relative universal movement, and second joint means connecting the other end of each of said link arms to said sub-assembly frame for relative universal movement.

2. The cultivator apparatus of claim 1 wherein each of said joint means comprises a bracket member and two pivot members mounted for relative rotation with respect to said bracket member about respective transverse axes, one of said rotatable members being connected to the respective end of said link arm and the other of said rotatable members being connected to the respective one of said frames.

3. The cultivator apparatus of claim 2 wherein said first direction is parallel to said main frame and said second direction is transverse to said main frame.

4. The cultivator apparatus of claim 2 wherein there is a respective one of said bracket members associated with each end of each of said link arms, wherein said joint means comprises a connecting member rigidly interconnecting each bracket member associated with a link arm of said first pair with an aligned bracket member associated with an arm of said second pair, and pivot members connected to said frames rotatably mounted on respective ones of said connecting members.

5. The cultivator apparatus of claim 4 wherein each of said link arms comprises a pair of parallel plates, said bracket members being disposed between said plates.

* * * * *